(12) United States Patent
Ananth

(10) Patent No.: US 12,395,934 B2
(45) Date of Patent: Aug. 19, 2025

(54) ULTRA-WIDEBAND POWER USAGE OPTIMIZATION

(71) Applicant: Google LLC, Mountain View, CA (US)

(72) Inventor: Sharath Ananth, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/002,040

(22) PCT Filed: Jan. 20, 2022

(86) PCT No.: PCT/US2022/013096
§ 371 (c)(1),
(2) Date: Dec. 15, 2022

(87) PCT Pub. No.: WO2023/140847
PCT Pub. Date: Jul. 27, 2023

(65) Prior Publication Data
US 2024/0251350 A1 Jul. 25, 2024

(51) Int. Cl.
*G08C 17/00* (2006.01)
*H04W 52/02* (2009.01)
(52) U.S. Cl.
CPC .............................. *H04W 52/0225* (2013.01)
(58) Field of Classification Search
CPC ... H04W 52/0225; H04W 4/023; H04W 4/80; H04W 4/40; H04W 52/0251; H04W 8/005; H04W 52/0212; H04W 52/0254; H04B 1/7163; H04M 1/72412; Y02D 30/70; G01S 5/017; G01S 13/765
See application file for complete search history.

(56) References Cited

U.S. PATENT DOCUMENTS

| | | | |
|---|---|---|---|
| 10,486,646 B2 | 11/2019 | Ledvina et al. | |
| 10,742,261 B2 | 8/2020 | Nabki et al. | |
| 11,503,358 B1 * | 11/2022 | Agrawal | H04N 21/4858 |
| 11,606,456 B1 * | 3/2023 | Kumar Agrawal | G06F 1/1694 |

(Continued)

FOREIGN PATENT DOCUMENTS

| | | |
|---|---|---|
| CN | 113419213 A | 9/2021 |
| JP | 2010071962 A | 4/2010 |

(Continued)

OTHER PUBLICATIONS

International Search Report and Written Opinion of International Application No. PCT/US2022/013096 dated Sep. 5, 2022, 10 pp.

(Continued)

*Primary Examiner* — Stephen M D Agosta
(74) *Attorney, Agent, or Firm* — Shumaker & Sieffert, P.A.

(57) ABSTRACT

A computing device may determine, via ultra-wideband ranging, that the computing device is proximate to a second computing device paired with the computing device. The computing device may determine that the second computing device is able to perform ultra-wideband ranging with a particular set of one or more devices. The computing device may, in response to determining that the computing device is proximate to the second computing device and that the second computing device is able to perform ultra-wideband ranging with the particular set of one or more devices, set an ultra-wideband component of the computing device to a power-saving mode.

18 Claims, 4 Drawing Sheets

(56) References Cited

U.S. PATENT DOCUMENTS

| | | | | |
|---|---|---|---|---|
| 2003/0099212 | A1* | 5/2003 | Anjum | H04W 92/02 |
| | | | | 370/328 |
| 2007/0155408 | A1* | 7/2007 | Belcea | H04W 4/023 |
| | | | | 455/458 |
| 2007/0184852 | A1* | 8/2007 | Johnson | H04W 64/00 |
| | | | | 455/456.1 |
| 2007/0184864 | A1* | 8/2007 | Leitch | H04W 52/0219 |
| | | | | 455/507 |
| 2009/0327910 | A1* | 12/2009 | Black | H04N 21/42225 |
| | | | | 715/744 |
| 2010/0278060 | A1* | 11/2010 | Lee | H04W 64/00 |
| | | | | 370/252 |
| 2013/0109319 | A1* | 5/2013 | Splitz | H04W 4/70 |
| | | | | 455/63.1 |
| 2013/0337739 | A1* | 12/2013 | Bernsen | H04W 12/50 |
| | | | | 455/7 |
| 2014/0273842 | A1* | 9/2014 | Takayanagi | H04W 52/0209 |
| | | | | 455/41.1 |
| 2014/0362725 | A1* | 12/2014 | Hoffmann | H04W 24/02 |
| | | | | 370/254 |
| 2017/0272270 | A1* | 9/2017 | Gu | H04B 17/318 |
| 2019/0155781 | A1* | 5/2019 | Amarilio | G06F 13/364 |
| 2019/0306796 | A1* | 10/2019 | Yagi | H04W 52/0216 |
| 2020/0275369 | A1* | 8/2020 | Foster | H04W 52/0225 |
| 2021/0072373 | A1 | 3/2021 | Schoenberg et al. | |
| 2021/0120485 | A1* | 4/2021 | Graul | H04W 52/0206 |
| 2021/0120555 | A1* | 4/2021 | Badic | H04W 72/12 |
| 2021/0288764 | A1* | 9/2021 | Linsky | H04L 65/611 |
| 2021/0304627 | A1* | 9/2021 | Ponda | G05D 1/0808 |
| 2022/0159782 | A1* | 5/2022 | Ouyang | H04L 1/0061 |
| 2022/0191309 | A1* | 6/2022 | Zhi | H04L 43/12 |
| 2023/0119256 | A1* | 4/2023 | Kumar Agrawal | G06F 3/0346 |
| | | | | 715/744 |
| 2024/0077596 | A1 | 3/2024 | Wang | |

FOREIGN PATENT DOCUMENTS

| | | |
|---|---|---|
| JP | 2010117241 A | 5/2010 |
| JP | 2015010924 A | 1/2015 |
| JP | 2020526142 A | 8/2020 |
| JP | 2020532207 A | 11/2020 |

OTHER PUBLICATIONS

Notice of Intent to Grant, and translation thereof, from counterpart Japanese Application No. 2022-577742 dated May 7, 2024, 5 pp.

Extended Search Report from counterpart European Application No. 22214203.6 dated Apr. 17, 2023, 5 pp.

Response to Extended Search Report dated Apr. 17, 2023, from counterpart European Application No. 22214203.6 filed Jan. 12, 2024, 73 pp.

International Preliminary Report on Patentability from International Application No. PCT/US2022/013096 dated Aug. 2, 2024, 7 pp.

Notice of Intent to Grant and Text Intended to Grant from counterpart European Application No. 22214203.6 dated Jul. 10, 2024, 45 pp.

* cited by examiner

ULTRA-WIDEBAND POWER USAGE OPTIMIZATION

BACKGROUND

Ultra-wideband is a short-range radio-frequency technology for wireless communication that enables computing devices to accurately identify the relative locations of the computing devices to other devices in their immediate vicinity. Computing devices that support ultra-wideband technology may periodically perform ultra-wideband ranging to determine distances of the computing devices to other ultra-wideband-enabled devices and/or to determine the angle of arrival of ultra-wideband signals between the computing devices and other ultra-wideband-enabled devices.

SUMMARY

In general, techniques of this disclosure are directed to optimizing the use of ultra-wideband by computing devices in ways to reduce the amount of power consumed to perform ultra-wideband ranging. A user may use both a first computing device and a second computing device that each periodically performs ultra-wideband ranging. When the first computing device performs ultra-wideband ranging, the first computing device may determine whether the second computing device is proximate to the first computing device. If the first computing device determines that the second computing device is proximate to the first computing device, the first computing device may determine whether the associated second device's ultra-wideband ranging capabilities can be used to accurately determine the proximity of the user to other ultra-wideband-enabled devices. If the first computing device determines that the associated second device's ultra-wideband ranging capabilities can be used to accurately determine the proximity of the user to other ultra-wideband-enabled devices, the first computing device may reduce the frequency with which the first computing device performs ultra-wideband ranging. By reducing the frequency with which the first computing device performs ultra-wideband ranging, the first computing device may reduce the amount of power consumed during operation while still being able to accurately determine the proximity of the user of the first computing device and the second computing device to other ultra-wideband-enabled devices.

In some aspects, the techniques described herein relate to a method including: determining, by a first computing device and via ultra-wideband ranging, that the first computing device is proximate to a second computing device paired with the first computing device; determining, by the first computing device, that the second computing device is able to perform ultra-wideband ranging with a particular set of one or more devices, and in response to determining that the first computing device is proximate to the second computing device and that the second computing device is able to perform ultra-wideband ranging with the particular set of one or more devices, setting, by the first computing device, an ultra-wideband component of the first computing device to a power-saving mode.

In some aspects, the techniques described herein relate to a computing device that includes: a memory; an ultra-wideband component; an ultra-wideband communication component; and one or more processors communicatively coupled to the memory and the ultra-wideband component and configured to: determine, via ultra-wideband ranging, that the computing device is proximate to a second computing device paired with the computing device; determine that the second computing device is able to perform ultra-wideband ranging with a particular set of one or more devices; and in response to determining that the computing device is proximate to the second computing device and that the second computing device is able to perform ultra-wideband ranging with the particular set of one or more devices, set the ultra-wideband component of the computing device to a power-saving mode.

In some aspects, the techniques described herein relate to a computer-readable storage medium storing instructions that, when executed, cause one or more processors of a computing device to: determine, via ultra-wideband ranging, that the computing device is proximate to a second computing device paired with the computing device; determine that the second computing device is able to perform ultra-wideband ranging with a particular set of one or more devices; and in response to determining that the computing device is proximate to the second computing device and that the second computing device is able to perform ultra-wideband ranging with the particular set of one or more devices, set an ultra-wideband component of the computing device to a power-saving mode.

In some aspects, the techniques described herein relate to an apparatus that includes: means for determining, via ultra-wideband ranging, that the computing device is proximate to a second computing device paired with the computing device; means for determining that the second computing device is able to perform ultra-wideband ranging with a particular set of one or more devices; and means for, in response to determining that the computing device is proximate to the second computing device and that the second computing device is able to perform ultra-wideband ranging with the particular set of one or more devices, setting an ultra-wideband component of the apparatus to a power-saving mode.

The details of one or more examples are set forth in the accompanying drawings and the description below. Other features, objects, and advantages of the disclosure will be apparent from the description and drawings, and from the claims.

DETAILED DESCRIPTION

Figure 1:
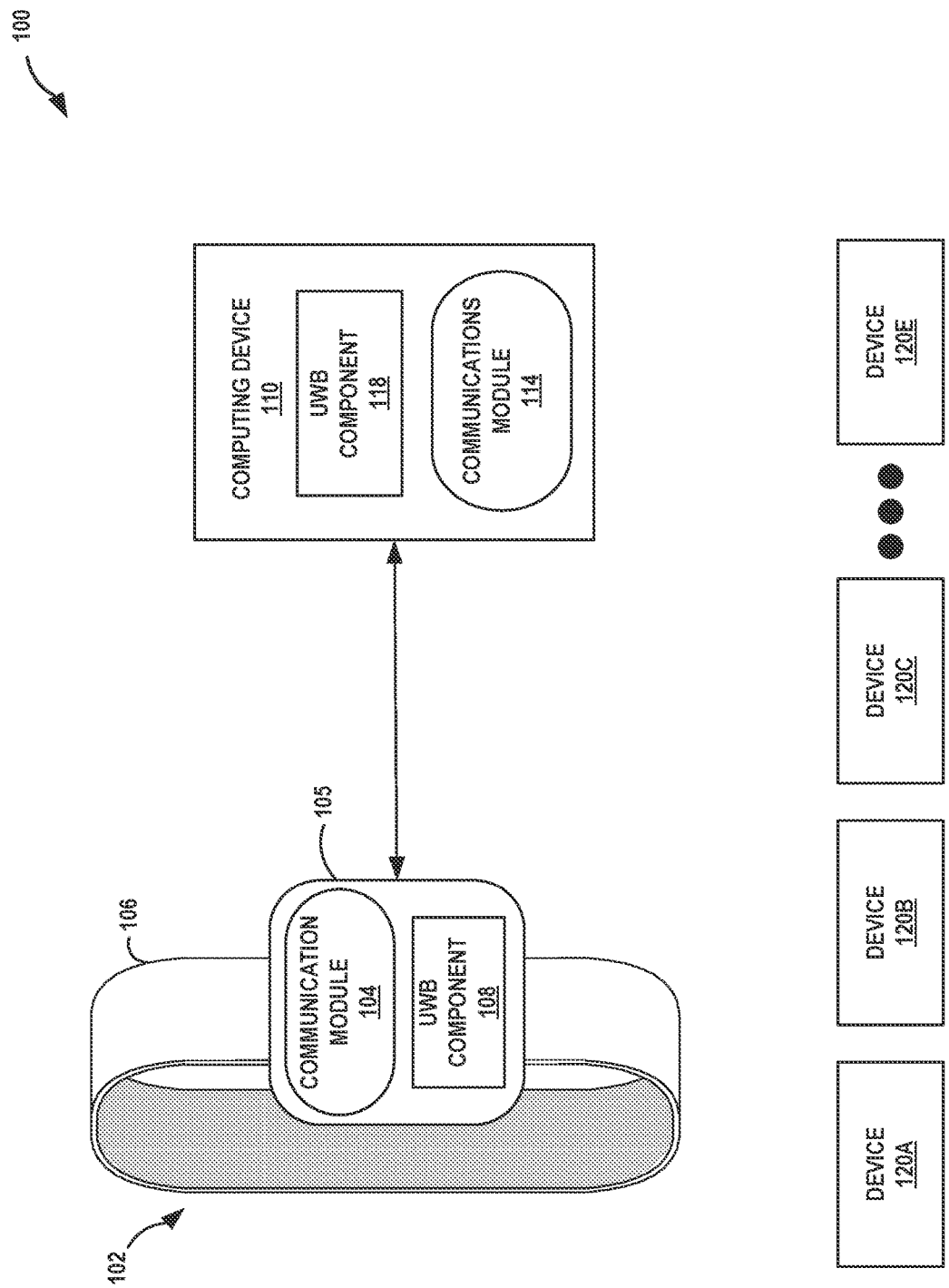
FIG. 1 is a conceptual diagram illustrating environment in which computing devices perform ultra-wideband ranging, in accordance with one or more aspects of the present disclosure.

In general, techniques of this disclosure are directed to optimizing the use of ultra-wideband by computing devices in ways to reduce the amount of power consumed to perform ultra-wideband ranging. A user may carry, wear, or otherwise use a computing device that performs ultra-wideband ranging to periodically determine the distance between the computing device and other ultra-wideband-enabled devices.

The user may use the computing device to perform ultra-wideband ranging with other devices to enable the other devices to detect when the computing device is proximate to the other devices. For example, the user may use the computing device to perform ultra-wideband ranging with an access control system, such as a keyless entry system of a vehicle, so that the computing device may act as a digital key for the vehicle. As the user moves towards a vehicle having a keyless entry system, the user's computing device may perform ultra-wideband ranging with the keyless entry system, so that the keyless entry system may determine the distance of the user of the computing device from the vehicle. When the keyless entry system detects that the user of the computing device is proximate to the vehicle, the keyless entry system may automatically unlock the doors of vehicle.

Increasingly, people may carry, wear, or otherwise use multiple mobile computing devices that each performs ultra-wideband ranging to determine the distances of each of the mobile computing devices to other ultra-wideband-enabled devices. For example, a user may carry a smart phone that performs ultra-wideband ranging while also wearing a wearable device (e.g., a smart watch) that also performs ultra-wideband ranging.

If multiple computing devices, such as both a smart phone and a smart watch are being carried by, worn by, or attached to a single user, the results (e.g., the determined distances to other ultra-wideband-enabled devices) of performing ultra-wideband ranging by each of the computing devices may be very similar to each due to the proximity of the computing devices to each other. As such, it may sometimes be redundant for each of the computing devices being carried by, worn by, or attached to a single user to frequently perform ultra-wideband ranging.

Different computing devices may have different ultra-wideband ranging characteristics. For example, a smart phone may have a greater ultra-wideband range compared with a wearable device. Further, because a wearable device typically has a much smaller battery than a smart phone, performing ultra-wideband ranging may consume a larger percentage of the battery life of a wearable device compared with a smart phone. As such, when a user uses both a wearable device and a smart phone that each performs ultra-wideband ranging, the redundant performance of ultra-wideband ranging by both the wearable device and the smart phone may unnecessarily drain the battery life of the wearable device at a faster rate compared with the smart phone.

In accordance with aspects of the present disclosure, when a first computing device that is being used by a user performs ultra-wideband ranging, the first computing device may determine whether a second computing device that performs ultra-wideband ranging and that is paired to the first computing device is proximate to the first computing device. For example, the first computing device may be a wearable device such as a smart watch and the second computing device may be a mobile computing device such as a smart phone or a laptop computer, where the first computing device and the second computing device are used by the same user.

If the first computing device determines that the second computing device is proximate to the first computing device, the first computing device may determine whether the second computing device's ultra-wideband ranging capabilities can accurately determine the proximity of the user of the first computing device and the second computing device to other ultra-wideband-enabled devices. If the first computing device determines that the second computing device's ultra-wideband ranging capabilities can accurately determine the proximity of the user of the first computing device and the second computing device to other ultra-wideband-enabled devices, the first computing device may set its ultra-wideband component to a power saving mode, thereby reducing battery usage of the first computing device and prolonging the battery life of the first computing device.

FIG. 1 is a conceptual diagram illustrating environment in which computing devices perform ultra-wideband ranging, in accordance with one or more aspects of the present disclosure. As shown in FIG. 1, environment 100 includes computing devices 102 and 110 and ultra-wideband (UWB)-enabled devices 120A-120E ("UWB-enabled devices 120"). Computing devices 102 and 110 and UWB-enabled devices 120 may each be configured to perform ultra-wideband ranging to determine the relative distance to other computing devices within ultra-wideband communications range. In some examples, each of computing devices 102 and 110 and UWB-enabled devices 120 may perform ultra-wideband ranging according to an ultra-wideband communications protocol, such as the Institute of Electrical and Electronics Engineers (IEEE) 802.15.4 protocol, to transmit data across a wide bandwidth, such as bandwidths greater than about 499 megahertz (MHz).

When a pair of computing devices communicate via an ultra-wideband communications protocol, such as the IEEE 802.15.4 protocol, to perform ultra-wideband ranging, the pair of computing devices may exchange timestamped messages via ultra-wideband communications. Each computing device in the pair of computing devices may use the time of flight of the messages to determine the physical distance between the pair of devices and/or an angle between the pair of devices (e.g., an angle of arrival of incoming radio-frequency signals).

Computing device 110 may be a mobile computing device, such as a mobile phone (e.g., a smartphone), a laptop computer, a tablet computer, a wearable computing device, a personal digital assistant (PDA), or any other mobile computing device. Computing device 110 includes ultra-wideband (UWB) component 118 and communication module 114. UWB component 118 may include hardware, such as circuitry, antenna(s), and the like for handling wireless communications, such as radio-frequency communications, using ultra-wideband communications protocols, such as the IEEE 802.15.4 protocol, to transmit data across a wide bandwidth, such as bandwidths greater than about 499 megahertz (MHz).

UWB component 118 may be configured to periodically perform ultra-wideband ranging to determine location information associated with computing device 110 using ultra-wideband communications. Specifically, UWB component 118 may be configured to perform ultra-wideband ranging to determine one or more devices (e.g., computing device 102, one or more of devices 120, etc.) that are within ultra-wideband communications range of computing device 110, which may be the one or more devices with which UWB component 118 is able to exchange messages via ultra-wideband communications. By exchanging messages via ultra-wideband communications with the one or more devices within ultra-wideband communications range with computing device 110, UWB component 118 may be able to determine the distance between computing device 110 and each of one or more computing device that are within ultra-wideband communications range of computing device 110, and may enable each respective computing device of the one or more computing device that are within ultra-wideband communications range of computing device 110 to determine the distance between computing device 110 and the respective computing device.

UWB component 118 may periodically perform ultra-wideband ranging to determine location information associated with computing device 110, such as every second, every five seconds, every thirty seconds, every minute, and the like. Communication module 114 may be software that executes at computing device 110 to control the operations of UWB component 118. For example, communication module 114 may execute to control how frequently UWB component 118 performs ultra-wideband ranging, such as by decreasing how frequently UWB component 118 performs ultra-wideband ranging, increasing how frequently UWB component 118 performs ultra-wideband ranging, and the like.

Computing device 102 may be a mobile computing device, such as a mobile phone (e.g., a smartphone), a laptop computer, a tablet computer, a personal digital assistant (PDA), or any other mobile computing device. In some examples, computing device 102 may be a wearable computing device such as a computerized watch (e.g., a smartwatch), a computerized fitness band/tracker, computerized eyewear, computerized headwear, a computerized glove, or any other type of mobile computing device that can attach to and be worn on a person's body or clothing.

In some of the examples where computing device 102 is a wearable computing device, computing device 102 may include attachment component 106 and electrical housing 105. Housing 105 of computing device 102 includes a physical portion of a wearable computing device that houses a combination of hardware, software, firmware, and/or other electrical components of computing device 102. For example, FIG. 1 shows that within housing 105, computing device 102 may include communication module 104 and UWB component 108. Housing 105 may also include other hardware components and/or software modules not shown in FIG. 1, such as one or more processors, memories, operating systems, applications, and the like.

Attachment component 106 may include a physical portion of a wearable computing device that comes in contact with a body (e.g., tissue, muscle, skin, hair, clothing, etc.) of a user when the user is wearing computing device 102 (though, in some examples, portions of housing 105 may also come in contact with the body of the user). For example, in cases where computing device 102 is a watch, attachment component 106 may be a watch band that fits around a user's wrist and comes in contact with the skin of the user. In examples where computing device 102 is eyewear or headwear, attachment component 106 may be a portion of the frame of the eyewear or headwear that fits around a user's head, and when computing device 102 is a glove, attachment component 106 may be the material of the glove that conforms to the fingers and hand of the user. In some examples, computing device 102 can be grasped and held from housing 105 and/or attachment component 106.

Computing device 102 includes ultra-wideband (UWB) component 108 and communication module 104. UWB component 108 may include hardware, such as circuitry, antenna(s), and the like for handling wireless communications, such as radio-frequency communications, using ultra-wideband communications protocols, such as the IEEE 802.15.4 protocol, to transmit data across a wide bandwidth, such as bandwidths greater than about 499 megahertz (MHz).

UWB component 108 may be configured to periodically perform ultra-wideband ranging to determine location information associated with computing device 102 using ultra-wideband communications. Specifically, UWB component 108 may be configured to perform ultra-wideband ranging to determine one or more devices (e.g., computing device 102, one or more of devices 120, etc.) that are within ultra-wideband communications range of computing device 102, which may be the one or more devices with which UWB component 108 is able to exchange messages via ultra-wideband communications. By exchanging messages via ultra-wideband communications with the one or more devices within ultra-wideband communications range with computing device 102, UWB component 108 may be able to determine the distance between computing device 102 and each of one or more computing device that are within ultra-wideband communications range of computing device 102, and may enable each respective computing device of the one or more computing device that are within ultra-wideband communications range of computing device 102 to determine the distance between computing device 102 and the respective computing device.

UWB component 108 may periodically perform ultra-wideband ranging to determine location information associated with computing device 102, such as every second, every five seconds, every thirty seconds, every minute, and the like. Communication module 104 may be software that executes at computing device 102 to control the operations of UWB component 108. For example, communication module 104 may execute to control how frequently UWB component 108 performs ultra-wideband ranging, such as by decreasing how frequently UWB component 108 performs ultra-wideband ranging, increasing how frequently UWB component 108 performs ultra-wideband ranging, and the like.

Ultra-wideband-enabled devices ("UWB-enabled devices") 120 may include any computing devices configured to communicate, via an ultra-wideband protocol such as via the IEEE 802.15.4 protocol, with computing devices 102 and/or 110 as computing devices 102 and/or 110 performs ultra-wideband ranging. UWB-enabled devices 120 may meet the technical specifications put out by the FiRa Consortium and/or the Car Connectivity Consortium. Examples of devices 120 may include smart home devices, vehicle keyless entry systems, point of sale terminals, UWB tags, UWB anchors, proximity sensing devices, computing devices, and the like.

A UWB-enabled device that communicates via ultra-wideband communications with a computing device may be able to determine, based on the communications, the distance of the computing device from the UWB-enabled device. For example, when a computing device (e.g., computing device 102 or computing device 110) within ultra-wideband range of an UWB-enabled device (e.g., any one of UWB-enabled devices 120) performs ultra-wideband ranging, the UWB-enabled device may exchange timestamped messages via ultra-wideband communications with the computing device, and may determine the time of flight of the messages to determine the physical distance and/or an angle between the UWB-enabled device and the computing device.

As such, each UWB-enabled device of UWB-enabled devices 120A may exchange messages via ultra-wideband communications with each computing device within ultra-wideband communications range to determine, based on the messages, the distance of each computing device from the UWB-enabled device. For example, if UWB-enabled device 120A communicates via ultra-wideband communications with computing device 102 as computing device 102 performs ultra-wideband ranging, both computing device 102 and UWB-enabled device 120A may be able to determine, based on the ultra-wideband communications, the distance between computing device 102 and UWB-enabled device 120A.

A UWB-enabled device may therefore be able to detect, based on ultra-wideband communications with other computing devices, computing devices that are proximate (e.g., within a specified distance) to the UWB-enabled device, and may, in response to detecting that a computing device is proximate to the UWB-enabled device, perform one or more actions. For example, if UWB-enabled device 120A is a keyless entry system for a vehicle, and if computing device 102 acts as a digital key fob for the vehicle, UWB-enabled device 120A may be able to determine, via ultra-wideband communications, the physical distance between computing device 102 and UWB-enabled device 120A (e.g., based on the time of flight of messages exchanged between computing device 102 and UWB-enabled device 120A) in order to determine whether computing device 102 is proximate (e.g., within a specified distance) to the vehicle. When UWB-enabled device 120A determines, based on ultra-wideband communications, the computing device 102 is proximate to the vehicle, UWB-enabled device 120A may unlock one or more doors of the vehicle, thereby using ultra-wideband communications to perform keyless entry of the vehicle.

In some examples, UWB-enabled devices may be paired with one or more computing devices. Each computing device paired with an UWB-enabled device may be a computing device that is recognized by the UWB-enabled device as an authorized or known computing device that may enable the UWB-enabled device to, in response to determining that the paired computing device is proximate to the UWB-enabled device, perform one or more actions.

For example, if computing device 102 that acts as a digital car key is paired with UWB-enabled device 120A that is a keyless entry system of a vehicle, pairing computing device 102 with UWB-enabled device 120A may enable computing device to act as a digital car key for UWB-enabled device 120A. Thus, UWB-enabled device 120A may, in response to determining that computing device 102 is proximate (e.g., within one meter) to UWB-enabled device 120A, unlock one or more doors of the vehicle. Similarly, if UWB-enabled device 120A determines that a computing device that is not paired with UWB-enabled device 120A is proximate to UWB-enabled device 120A, UWB-enabled device 120A may refrain from unlocking one or more doors of the vehicle.

In the example of FIG. 1, computing device 110 may be paired with, tethered to, or otherwise associated with computing device 102, so that computing devices 102 and 110 are communicatively coupled. In some examples, computing device 102 may pair with or be tethered to computing device 110 to act as a companion device to computing device 110. For example, if computing device 102 is a wearable computing device, such as a smart watch, and if computing device 110 is a smartphone, computing device 102 may pair with computing device 110 to act as a companion device to computing device 110. In some examples, computing devices 102 and 110 may be paired with each other when computing devices 102 and 110 are associated with the same user and/or same user account.

In examples where computing devices 102 and 110 are both used by the same user, the user of computing devices 102 and 110 may wear, attach, and/or carry computing devices 102 and 110 so the computing devices 102 and 110 are with the user. For example, if computing device 102 is a wearable computing device, such as a smartwatch, and if computing device 110 is a smartphone, the user may wear computing device 102 on their body, such as by attaching computing device 102 via attachment component 106 to the user's body or clothing, while also carrying or holding computing device 102 in a pocket, a handbag, with the user's hand, etc.

As the user travels around with both computing devices 102 and 110, computing device 102 and computing device 110 may both continue to periodically perform ultra-wideband ranging to communicate with one or more of UWB-enabled devices 120 within ultra-wideband communications range of computing devices 102 and 110 to enable one or more of UWB-enabled devices 120 to determine whether computing devices 102 and/or 110 are proximate to the one or more UWB-enabled devices.

However, if the user wears, holds, and/or carries both computing device 102 and 110, it may be redundant for both computing devices 102 and 110 to periodically perform ultra-wideband ranging because computing devices 102 and 110 are likely to be very close in distance (e.g., within less than a meter) from each other. That is, if one of computing devices 102 and 110 is proximate to a UWB-enabled device, then the other one of computing devices 102 and 110 is likely to also be proximate to the UWB-enabled device.

In examples where the computing device is a mobile computing device powered by a battery, how frequently the computing device performs ultra-wideband ranging may affect the computing device's battery life Specifically, decreasing the frequency with which the computing device performs ultra-wideband ranging may decrease power consumption and increase battery life. In examples where computing device 102 is a wearable device, such as a smartwatch and where computing device 110 is a smartphone, computing device 102 may have a much smaller battery than computing device 110. Thus, performing ultra-wideband ranging may have a greater impact on computing device 102's battery life compared with computing device 110's battery life.

In accordance with aspects of the present disclosure, because it may be redundant for both computing devices 102 and 110 to periodically perform ultra-wideband ranging, computing device 102 may, in certain instances, decrease the frequency with which computing device 102 performs ultra-wideband ranging based on determining whether computing device 110's ultra-wideband ranging capabilities can be used to accurately determine the proximity of the user of computing devices 102 and 110 to UWB-enabled devices. If computing device 102 determines that computing device 110's ultra-wideband ranging capabilities can be used to accurately determine the proximity of the user of computing devices 102 and 110 to UWB-enabled devices, computing device 102 may reduce the frequency with which computing device 102 performs ultra-wideband ranging, thereby reducing the power usage of UWB component 108 and extending computing device 102's battery life.

As part of determining whether computing device 110's ultra-wideband ranging capabilities can be used to accurately determine the proximity of the user of computing devices 102 and 110 to UWB-enabled devices 120, computing device 102 may determine whether computing device 110 that includes UWB component 118 is proximate to computing device 102. For example, computing device 102 may determine that computing device 110 is proximate to computing device 102 if computing device 110 is less than one meter, less than half a meter, and the like from computing device 102.

Computing device 102 may determine whether computing device 110 is proximate to computing device 102 using any suitable ranging or proximity detection technique. In one example, computing device 102 may determine whether computing device 110 is proximate to computing device 102 by using UWB component 108 to perform ultra-wideband ranging. That is, computing device 102 may use UWB component 108 to exchange messages with UWB component 118 of computing device 110 via ultra-wideband communications to determine the distance of computing device 110 from computing device 102 based on the time of flight of the messages.

In certain instances, even if computing device 110 is proximate to computing device 102, computing device 110's ultra-wideband ranging capabilities may nevertheless fail to accurately determine the proximity of the user of computing devices 102 and 110 to UWB-enabled devices 120. In examples where computing device 102 is a smart watch and computing device 110 is a smart phone, the UWB antenna of computing device 102 may be weaker than the UWB antenna of computing device 110 by about 10 decibels (dBs). However, when computing device 102 is worn on the wrist of the user while computing device 110 is being carried in a back pocket of the user's trousers, the body absorption of computing device 110's ultra-wideband signals may significantly attenuate ultra-wideband signals from computing device 110, such as by decreasing the gain of the UWB antenna of computing device 110 by 20-25 dBs, thereby potentially causing computing device 110 to have significantly worse ultra-wideband ranging performance than computing device 102.

As such, computing device 102 may, in response to determining that computing device 110 is proximate to computing device 102, determine whether computing device 110 is able to accurately determine the proximity of the user of computing devices 102 and 110 to UWB-enabled devices 120. Specifically, computing device 102 may select a particular set of one or more UWB-enabled devices and may, in response to determining that computing device 110 is proximate to computing device 102, determine whether computing device 110 is able to perform ultra-wideband ranging with the particular set of one or more devices.

In some examples, the particular set of one or more devices may be every device paired with both computing device 102 and computing device 110. That is, computing device 102 may determine if computing device 110 is able to perform ultra-wideband ranging to send and receive messages via ultra-wideband communications with every device paired with both computing device 102 and computing device 110. For example, if UWB-enabled devices 120A-120C are paired with both computing devices 102 and 110, computing device 102 may determine if computing device 110 is able to perform ultra-wideband ranging to send and receive messages via ultra-wideband communications with each of UWB-enabled devices 120A-120C. If computing device 102 determines that computing device 110 is able to perform ultra-wideband ranging to send and receive messages via ultra-wideband communications with each of UWB-enabled devices 120A-120C, computing device 102 may determine that computing device 110's ultra-wideband ranging capabilities can be used to accurately determine the proximity of the user of computing devices 102 and 110 to UWB-enabled devices 120.

Computing device 110 may send, to computing device 102, an indication of one or more UWB-enabled devices with which computing device 110 is able to send and receive messages via performance of ultra-wideband ranging, and computing device 102 may determine whether the one or more UWB-enabled devices with which computing device 110 is able to send and receive messages via performance of ultra-wideband ranging matches all of the UWB-enabled devices paired with both computing device 102 and computing device 110. If computing device 102 determines that the one or more UWB-enabled devices with which computing device 102 is able to send and receive messages via performance of ultra-wideband ranging matches all of the UWB-enabled devices paired with both computing device 102 and computing device 110, computing device 102 may determine that computing device 110's ultra-wideband ranging capabilities can be used to accurately determine the proximity of the user of computing devices 102 and 110 to UWB-enabled devices 120.

In some examples, the particular set of one or more devices may be the one or more devices with which computing device 102 is able to perform ultra-wideband ranging. That is, computing device 102 may determine if computing device 110 is able to perform ultra-wideband ranging to send and receive messages via ultra-wideband communications with every device with which computing device 102 is able to perform ultra-wideband ranging.

For example, if computing device 102 is able to perform ultra-wideband ranging to send and receive messages via ultra-wideband communications with UWB-enabled devices 120A and 120B, computing device 102 may determine if computing device 110 is able to perform ultra-wideband ranging to send and receive messages via ultra-wideband communications with UWB-enabled devices 120A and 120B. If computing device 102 determines that computing device 110 is able to perform ultra-wideband ranging to send and receive messages via ultra-wideband communications with each of UWB-enabled devices 120A and 120B, computing device 102 may determine that computing device 110's ultra-wideband ranging capabilities can be used to accurately determine the proximity of the user of computing devices 102 and 110 to UWB-enabled devices 120.

Computing device 110 may send, to computing device 102, an indication of one or more UWB-enabled devices with which computing device 110 is able to send and receive messages via performance of ultra-wideband ranging, and computing device 102 may determine whether the one or more UWB-enabled devices with which computing device 110 is able to send and receive messages via performance of ultra-wideband ranging matches the one or more UWB-enabled devices with which computing device 102 is able to send and receive messages via performance of ultra-wideband ranging. If computing device 102 determines that the one or more UWB-enabled devices with which computing device 110 is able to send and receive messages via performance of ultra-wideband ranging matches the one or more UWB-enabled devices with which computing device 102 is able to send and receive messages via performance of ultra-wideband ranging, computing device 102 may determine that computing device 110's ultra-wideband ranging capabilities can be used to accurately determine the proximity of the user of computing devices 102 and 110 to UWB-enabled devices 120.

Computing device 102 may, in response to determining that computing device 110's ultra-wideband ranging capabilities can be used to accurately determine the proximity of the user of computing devices 102 and 110 to UWB-enabled devices 120, set UWB component 108 to a power-saving mode. In some examples, computing device 102 setting UWB component 108 to a power-saving mode includes decreasing the frequency with which UWB component 108 performs ultra-wideband ranging. For example, if UWB component 108 is performing ultra-wideband ranging at a frequency of once every five seconds, once every seven seconds, and the like, computing device 102 may decrease the frequency with which UWB component 108 performs ultra-wideband ranging to once every thirty seconds, once every minute, and the like. By decreasing the frequency with which UWB component 108 performs ultra-wideband ranging, computing device 102 may therefore, in some examples, perform ultra-wideband ranging less frequently than computing device 110.

When UWB component 108 is set to the power-saving mode, UWB 108 may continue to periodically perform ultra-wideband ranging to send and receive messages with one or more of UWB-enabled devices 120 at the decreased frequency. As part of periodically performing ultra-wideband ranging while UWB component 108 is in the power-saving mode, computing device 102 may periodically determine whether computing device 110 is proximate to computing device 102, such as via ultra-wideband ranging as described above, or via any other suitable proximity detection techniques (e.g., via Bluetooth).

If computing device 102 determines that computing device 110 is no longer proximate to computing device 102, computing device 102 may set UWB component 108 to a normal operating mode, thereby exiting the power-saving mode. In some examples, computing device 102 setting UWB component 108 to a normal operating mode includes increasing the frequency with which UWB component 108 performs ultra-wideband ranging from the frequency with which UWB component 108 performed ultra-wideband ranging while in the power-saving mode. For example, if UWB component 108 is performing ultra-wideband ranging in the power-saving mode at a frequency of once every thirty seconds, once every minute, and the like, computing device 102 may increase the frequency with which UWB component 108 performs ultra-wideband ranging to once every five seconds, once every ten seconds, and the like.

While UWB component 108 is in the power-saving mode, if computing device 102 determines that computing device 110 is proximate to computing device 102, computing device 102 may determine whether computing device 110's ultra-wideband ranging capabilities can be used to accurately determine the proximity of the user of computing devices 102 and 110 to UWB-enabled devices 120, as described above.

Computing device 110 is able to perform ultra-wideband ranging with a particular set of one or more devices, as described above. If computing device 102 determines that computing device 110's ultra-wideband ranging capabilities can be used to accurately determine the proximity of the user of computing devices 102 and 110 to UWB-enabled devices 120, computing device 102 may enable UWB component 108 to remain in the power-saving mode. If computing device 102 determines that computing device 110's ultra-wideband ranging capabilities cannot be used to accurately determine the proximity of the user of computing devices 102 and 110 to UWB-enabled devices 120, computing device 102 may set UWB component 108 to a normal operating mode, as described above.

Figure 2:
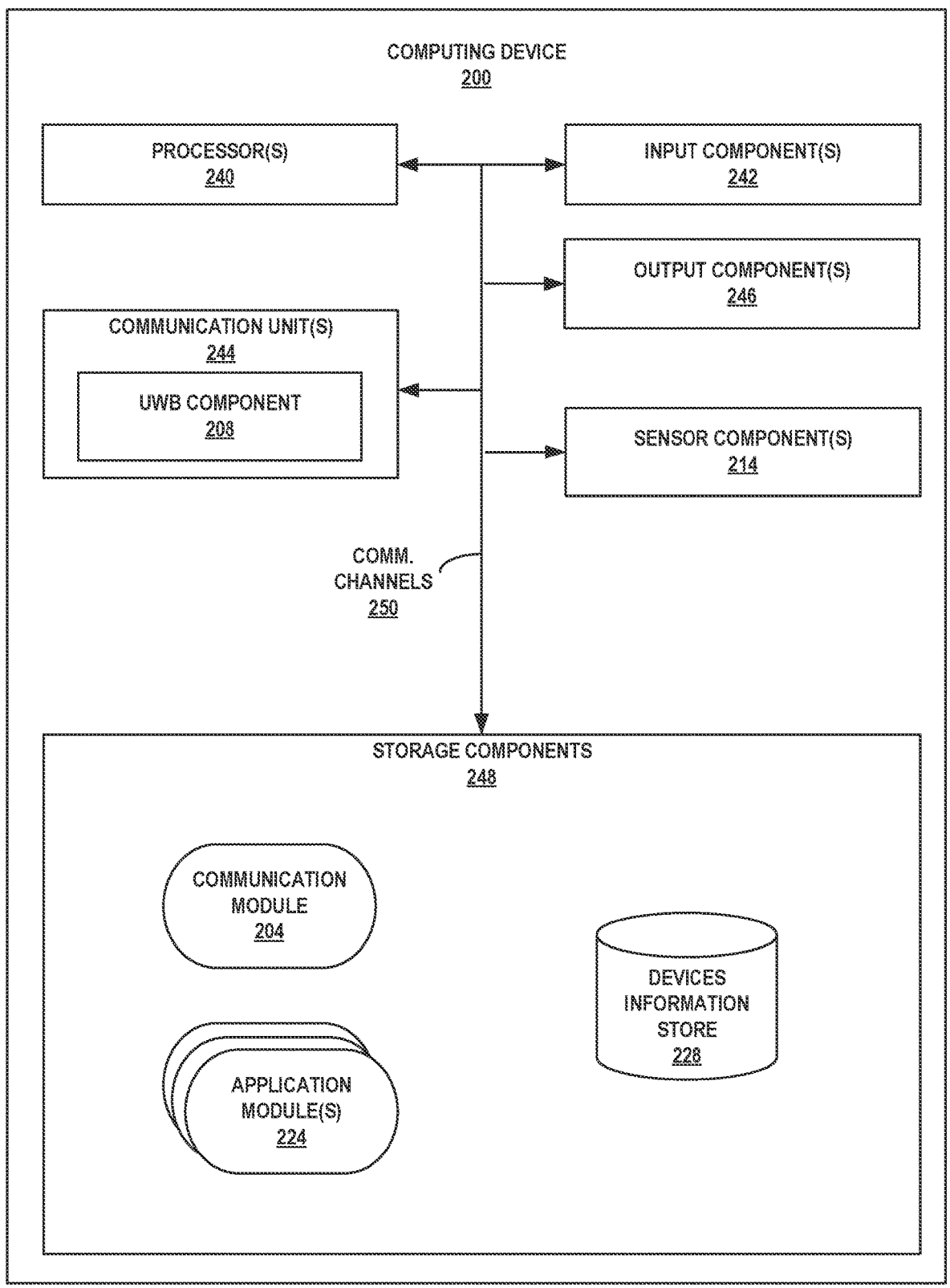
FIG. 2 is a block diagram illustrating further details of a computing device that performs ultra-wideband ranging, in accordance with one or more aspects of the present disclosure.

FIG. 2 is a block diagram illustrating further details of a computing device 200 that performs ultra-wideband ranging, in accordance with one or more aspects of the present disclosure. Computing device 200 of FIG. 2 is described below as an example of computing device 200 illustrated in FIG. 1. FIG. 2 illustrates only one particular example of computing device 200, and many other examples of computing device 200 may be used in other instances and may include a subset of the components included in example computing device 200 or may include additional components not shown in FIG. 2.

As shown in the example of FIG. 2, computing device 200 includes one or more processors 240, one or more input components 242, one or more communication units 244, one or more output components 246, and one or more storage components 248. Input components 242 include sensor components 214. Storage components 248 of computing device 200 also include communication module 204, application modules 224, and physical devices information store 228.

Communication channels 250 may interconnect each of the components 240, 242, 244, 246, 248, and 214 for inter-component communications (physically, communicatively, and/or operatively). In some examples, communication channels 250 may include a system bus, a network connection, an inter-process communication data structure, or any other method for communicating data.

One or more input components 242 of computing device 200 may receive input. Examples of input are tactile, audio, and video input. Input components 242 of computing device 200, in one example, includes a presence-sensitive display, touch-sensitive screen, mouse, keyboard, voice responsive system, video camera, microphone or any other type of device for detecting input from a human or machine.

One or more input components 242 include one or more sensor components 214. Numerous examples of sensor components 214 exist and include any input component configured to obtain environmental information about the circumstances surrounding computing device 200 and/or physiological information that defines the activity state and/or physical well-being of a user of computing device 200. In some examples, a sensor component may be an input component that obtains physical position, movement, and/or location information of computing device 200. For instance, sensor components 214 may include one or more location sensors (GPS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 200 may generate output. Examples of output are tactile, audio, and video output. Output components 246 of computing device 200, in one example, includes a presence-sensitive display, sound card, video graphics adapter card, speaker, a liquid crystal display (LCD), or any other type of device for generating output to a human or machine.

One or more communication units 244 of computing device 200 may communicate with external devices via one or more wired and/or wireless networks by transmitting and/or receiving network signals on the one or more networks. Examples of one or more communication units 244 include a network interface card (e.g., such as an Ethernet card), an optical transceiver, a radio frequency transceiver, a GPS receiver, or any other type of device that can send and/or receive information. Other examples of one or more communication units 244 may include short wave radios, cellular data radios, wireless network radios, as well as universal serial bus (USB) controllers.

One or more processors 240 may implement functionality and/or execute instructions within computing device 200. For example, one or more processors 240 on computing device 200 may receive and execute instructions stored by storage components 248 that execute the functionality of modules 204 and 224. The instructions executed by one or more processors 240 may cause computing device 200 to store information within storage components 248 during program execution. Examples of one or more processors 240 include application processors, display controllers, sensor hubs, and any other hardware configured to function as a processing unit. One or more processors 240 may execute instructions of modules 204 and 224 to cause one or more output components 246 to render portions of content of display data as one of user interface screen shots at one or more output components 246. That is, modules 204 and 224 may be operable by one or more processors 240 to perform various actions or functions of computing device 200.

One or more storage components 248 within computing device 200 may store information for processing during operation of computing device 200 (e.g., computing device 200 may store data accessed by modules 204 and 224 during execution at computing device 200). In some examples, storage component 248 is a temporary memory, meaning that a primary purpose of storage component 248 is not long-term storage. Storage components 248 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 204 and 224 as well as devices information store 228.

Application modules 224 represent all the various individual applications and services executing at computing device 200. A user of computing device 200 may interact with an interface (e.g., a graphical user interface) associated with one or more application modules 224 to cause computing device 200 to perform a function. Numerous examples of application modules 224 may exist and include a digital car key application, a smart home application, a fitness application, a calendar application, a personal assistant or prediction engine, a search application, a map or navigation application, a transportation service application (e.g., a bus or train tracking application), a social media application, a game application, an e-mail application, a messaging application, an Internet browser application, or any and all other applications that may execute at computing device 200.

In FIG. 2, communication module 204 may execute at one or more processors 240 to control the operations of UWB component 208. For example, communication module 204 may execute at one or more processors 240 to control the frequency with which UWB component 208 performs ultra-wideband ranging, including increasing the frequency with which UWB component 208 performs wideband ranging, decreasing the frequency with which UWB component 208 performs wideband ranging, and/or otherwise setting the frequency with which UWB component 208 performs wideband ranging.

Communication module 204 may execute at one or more processors 240 to determine whether to change the frequency with which UWB component 208 performs ultra-wideband ranging based at least in part on determining whether another computing device having ultra-wideband ranging capabilities that is paired to computing device 202 and that is used by the same user as computing device 202 can be used to accurately determine the proximity of the user of computing device 202 to UWB-enabled devices. For example, if computing device 202 is an example of computing device 102 of FIG. 1, communication module 204 may determine whether computing device 110 of FIG. 1 can be used to accurately determine the proximity of the user of computing devices 102 and 110 to UWB-enabled devices.

Each time UWB component 208 performs ultra-wideband ranging, computing device 202 may receive information that communication module 204 may use to determine the one or more devices within ultra-wideband range of computing device 202 and the distance between computing device 202 and each of the one or more devices. Such one or more devices within ultra-wideband range of computing device 202 may be devices that are able to exchange messages with computing device 202 via an ultra-wideband protocol, such as the IEEE 802.15.4 protocol. For example, UWB component 208 may exchange timestamped messages with each of the one or more devices.

The messages may indicate, for example, the identity of each of the one or more devices. Communication module 204 may use the identity of each of the one or more devices indicated in the messages received by UWB component 208 to determine whether one of the devices within ultra-wideband range of computing device 202 is a paired device (referred herein as a "paired device"). For example, communication module 204 may compare the identity of each of the one or more devices with the identity of the paired device that is stored in devices information store 228. If communication module 204 determines that none of the one or more devices within ultra-wideband range of UWB component 208 is a paired device, communication module 204 may refrain from changing the frequency with which UWB component 208 performs ultra-wideband ranging.

Communication module 204 may use the time of flight of the messages exchanged between UWB component 208 and each of the one or more devices within ultra-wideband range of UWB component 208 to determine the physical distances and/or angles of arrival between computing device 202 and each of the one or more devices. As such, if communication module 204 determines that the one or more devices within ultra-wideband range of UWB component 208 includes a paired device, communication module 204 may determine the distance between computing device 202 and the paired device.

Specifically, communication module 204 may determine if the paired device is proximate to computing device 202. Communication module 204 may determine that the paired device is proximate to computing device 202 is proximate to computing device 202 if the distance between computing device 202 and the paired device is within (e.g., less than or equal to) a proximity threshold. Examples of such a proximity threshold may be one meter, half of a meter, twenty centimeters, and the like. If communication module 204 determines that the paired device is not proximate to computing device 202, communication module 204 may refrain from changing the frequency with which UWB component 208 performs ultra-wideband ranging.

If communication module 204 determines that the paired device is proximate to computing device 202, communication module 204 may determine whether the paired device is able to accurately determine the proximity of the user of computing device 202 to UWB-enabled devices 120. Specifically, communication module 204 may select a particular set of one or more UWB-enabled devices and may, in response to determining that the paired device is proximate to computing device 202, determine whether the paired device is able to perform ultra-wideband ranging with the particular set of one or more devices selected by communication module 204.

In some examples, the particular set of one or more devices may be every device paired, via ultra-wideband communications, with both computing device 202 and the paired device. That is, computing device 102 may determine if the paired device is able to perform ultra-wideband ranging to send and receive messages via ultra-wideband communications with every device paired with both computing device 202 and the paired device.

For example, devices information store 228 may store the identity of every device paired, via ultra-wideband communications, with both computing device 202 and the paired device. Computing device 202 may receive, from the paired device, indications of the identity of every device within ultra-wideband range of the paired device, as determined during the most recent performance of ultra-wideband ranging by the paired device. Computing device 202 may therefore compare the identity of every device within ultra-wideband range of the paired device with the identity of every device paired, via ultra-wideband communications, with both computing device 202 and the paired device stored in devices information store 228 to determine whether the paired device is able to perform ultra-wideband ranging to send and receive messages via ultra-wideband communications with every device paired with both computing device 202 and the paired device.

In some examples, computing device 202 may receive the identity of every device within ultra-wideband range of the paired device when computing device 202 communicates with the paired device during ultra-wideband ranging. In some examples, computing device 202 may receive the identity of every device within ultra-wideband range of the paired device when computing device 202 communicates with the paired device using a communication protocol other than ultra-wideband ranging, such as Bluetooth Low Energy or Wi-Fi.

If communication module 204 determines that the paired device is not able to perform ultra-wideband ranging to send and receive messages via ultra-wideband communications with every device paired with both computing device 202 and the paired device, communication module 204 may determine that the paired device is unable to accurately determine the proximity of the user of computing device 202 to UWB-enabled devices, and may refrain from changing the frequency with which UWB component 208 performs ultra-wideband ranging. If communication module 204 determines that the paired device is able to perform ultra-wideband ranging to send and receive messages via ultra-wideband communications with every device paired with both computing device 202 and the paired device, communication module 204 may determine that the paired device is able to accurately determine the proximity of the user of computing device 202 to UWB-enabled devices.

In some examples, the particular set of one or more devices may be every device that is within ultra-wideband range of UWB component 208. That is, computing device 202 may determine if the paired device is able to perform ultra-wideband ranging to send and receive messages via ultra-wideband communications with every device within ultra-wideband range of UWB component 208.

Computing device 202 may therefore compare the identity of every device within ultra-wideband range of the paired device with the identity of every device that is within ultra-wideband range of UWB component 208, as determined by the most recent ultra-wideband ranging performed by UWB component 208, to determine whether the paired device is able to perform ultra-wideband ranging to send and receive messages via ultra-wideband communications with every device that is currently within ultra-wideband range of UWB component 208.

If computing device 202 determines that he paired device is able to perform ultra-wideband ranging to send and receive messages via ultra-wideband communications with every device that is within ultra-wideband range of UWB component 208, communication module 204 may determine that the paired device is unable to accurately determine the proximity of the user of computing device 202 to UWB-enabled devices, and may refrain from changing the frequency with which UWB component 208 performs ultra-wideband ranging. If communication module 204 determines that the paired device is able to perform ultra-wideband ranging to send and receive messages via ultra-wideband communications with every device that is within ultra-wideband range of UWB component 208, communication module 204 may determine that the paired device is able to accurately determine the proximity of the user of computing device 202 to UWB-enabled devices.

If communication module 204 determines that the paired device is able to accurately determine the proximity of the user of computing device 202 to UWB-enabled devices, communication module 204 may set UWB component 208 to a power-saving mode. In some examples, communication module 204 setting UWB component 208 to a power-saving mode includes decreasing the frequency with which UWB component 208 performs ultra-wideband ranging. For example, if UWB component 208 is performing ultra-wideband ranging at a frequency of once every five seconds, once every seven seconds, and the like, communication module 204 may decrease the frequency with which UWB component 108 performs ultra-wideband ranging to once every thirty seconds, once every minute, and the like. By decreasing the frequency with which UWB component 208 performs ultra-wideband ranging, computing device 202 may therefore, in some examples, perform ultra-wideband ranging less frequently than the paired device.

When UWB component 208 is set to the power-saving mode, UWB 208 may continue to periodically perform ultra-wideband ranging to send and receive messages with one or more UWB-enabled devices within ultra-wideband range at the decreased frequency. As part of periodically performing ultra-wideband ranging while UWB component 208 is in the power-saving mode, communication module 204 may determine whether the paired device is proximate to computing device 202, as described above.

If communication module 204 determines that the paired device is no longer proximate to computing device 202, communication module 204 may set UWB component 208 to a normal operating mode, thereby exiting the power-saving mode. In some examples, communication module 204 setting UWB component 208 to a normal operating mode includes increasing the frequency with which UWB component 208 performs ultra-wideband ranging from the frequency with which UWB component 208 performed ultra-wideband ranging while in the power-saving mode. For example, if UWB component 208 is performing ultra-wideband ranging in the power-saving mode at a frequency of once every thirty seconds, once every minute, and the like, communication module 204 may increase the frequency with which UWB component 208 performs ultra-wideband ranging to once every five seconds, once every ten seconds, and the like.

While UWB component 208 is in the power-saving mode, if communication module 204 determines that the paired device is proximate to computing device 202, communication module 204 may determine whether the paired device's ultra-wideband ranging capabilities can be used to accurately determine the proximity of the user of computing device 202 to UWB-enabled devices, as described above.

If computing device determines that the paired device's ultra-wideband ranging capabilities can be used to accurately determine the proximity of the user of computing device 202 to UWB-enabled devices, communication module 204 may enable UWB component 208 to remain in the power-saving mode. If computing device determines that the paired device's ultra-wideband ranging capabilities cannot be used to accurately determine the proximity of the user of computing device 202 to UWB-enabled devices, communication module 204 may set UWB component 208 to a normal operating mode, as described above.

In some examples, communication module 204 may use additional or alternative techniques to change the frequency with which UWB component 208 performs ultra-wideband ranging. In some examples, communication module 204 may perform activity recognition to recognize the physical activity being performed by the user of computing device 202 and may change the frequency with which UWB component 208 performs ultra-wideband ranging based on the physical activity being performed by the user.

Figure 3:
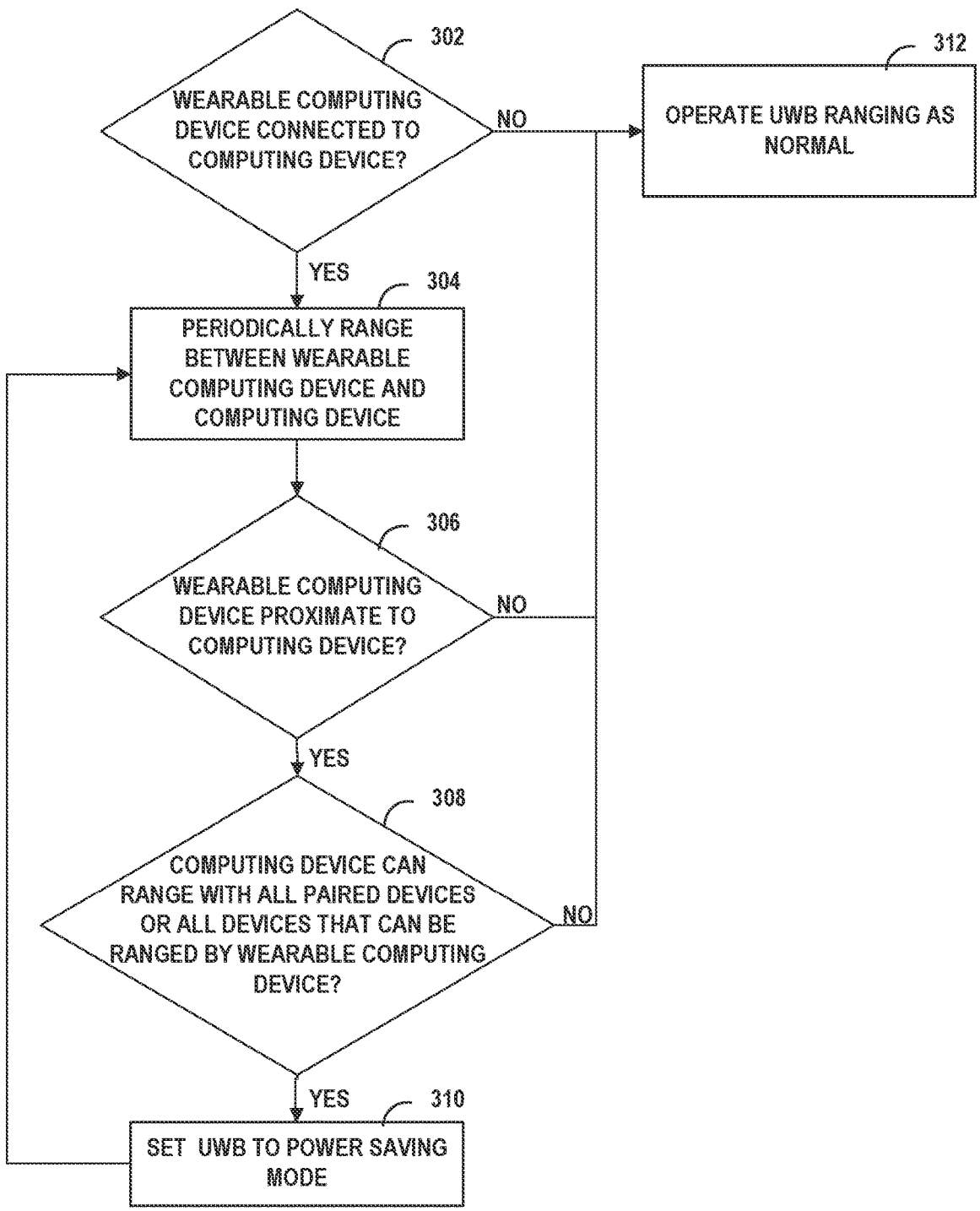
FIG. 3 is a flow diagram illustrating an example technique for ultra-wideband optimization, in accordance with aspects of the present disclosure.

For example, communication module 204 may use data generated by one or more sensor components 214 to determine whether the user is moving (e.g., walking, running, riding in a vehicle, etc.) or whether the user is not moving (e.g., sitting, standing, etc.). If the user is not moving, then it may be unnecessary to determine whether the user is moving towards a UWB-enabled device. As such, if communication module 204 determines that the user is not moving, communication module 204 may set UWB component 208 to a power saving mode. Similarly, if communication module 204 determines that the user is moving, communication module 204 may set UWB component 208 to a normal operating mode FIG. 3 is a flow diagram illustrating an example technique for ultra-wideband optimization, in accordance with aspects of the present disclosure. For purposes of illustration only, the example operations are described below within the context of FIG. 1, where computing device 102 is a wearable device that can be tethered to computing device 110. When computing device 102 is a wearable device, computing device 102 may be worn or otherwise attached to the user of computing device 102 and may be in an unlocked state.

As shown in FIG. 3, computing device 102 may determine whether computing device 102 is connected to computing device 110 (302). Computing device 102 may be connected to computing device 110 if computing device 102 is tethered to computing device 110 or otherwise communicably coupled to computing device 110 via wireless communications, such as via ultra-wideband, Bluetooth, Bluetooth Low Energy, Wi-Fi, and the like. If computing device 102 determines that computing device 102 is not connected to computing device 110, computing device 102 may perform ultra-wideband ranging via UWB component 108 as normal (312).

If computing device 102 determines that computing device 102 is connected to computing device 110, computing device 102 may, as part of periodically performing ultra-wideband ranging with UWB-enabled devices 120 using UWB component 108, periodically perform ultra-wideband ranging with computing device 110 to determine the distance between computing devices 102 and 110 (304). Computing device 102 may determine, based on the distance between computing devices 102 and 110, whether computing device 102 is proximate to computing device 110 (306).

If computing device 102 determines that computing device 102 is not proximate to computing device 110, computing device 102 may perform ultra-wideband ranging via UWB component 108 as normal (312). If computing device determines that computing device 102 is proximate to computing device 110, computing device 102 may determine whether computing device 110 can, when performing ultra-wideband ranging, communicate, via ultra-wideband communications, with all UWB-enabled devices that are paired with both computing devices 102 and 110 or whether computing device 110 can, when performing ultra-wideband ranging, communicate, via ultra-wideband communications, with all UWB-enabled devices with which computing device 102 is able to communicate via ultra-wideband communications (308).

If computing device 102 determines that computing device 110 is not able to communicate, via ultra-wideband communications, with all UWB-enabled devices that are paired with both computing devices 102 and 110 and that computing device 110 is not able to communicate, via ultra-wideband communications, with all UWB-enabled devices with which computing device 102 is able to communicate via ultra-wideband communications, computing device 102 may perform ultra-wideband ranging via UWB component 108 as normal (312). If computing device 102 determines that computing device 110 is able to communicate, via ultra-wideband communications, with all UWB-enabled devices that are paired with both computing devices 102 and 110 or that computing device 110 is able to communicate, via ultra-wideband communications, with all UWB-enabled devices with which computing device 102 is able to communicate via ultra-wideband communications, computing device 102 may set UWB component 108 to a power-saving mode, thereby decreasing the frequency with which UWB component 108 periodically performs ultra-wideband ranging (310). Computing device 102 may therefore return to periodically performing ultra-wideband ranging with UWB-enabled devices 120 using UWB component 108, including periodically perform ultra-wideband ranging with computing device 110 to determine the distance between computing devices 102 and 110 (304).

Figure 4:
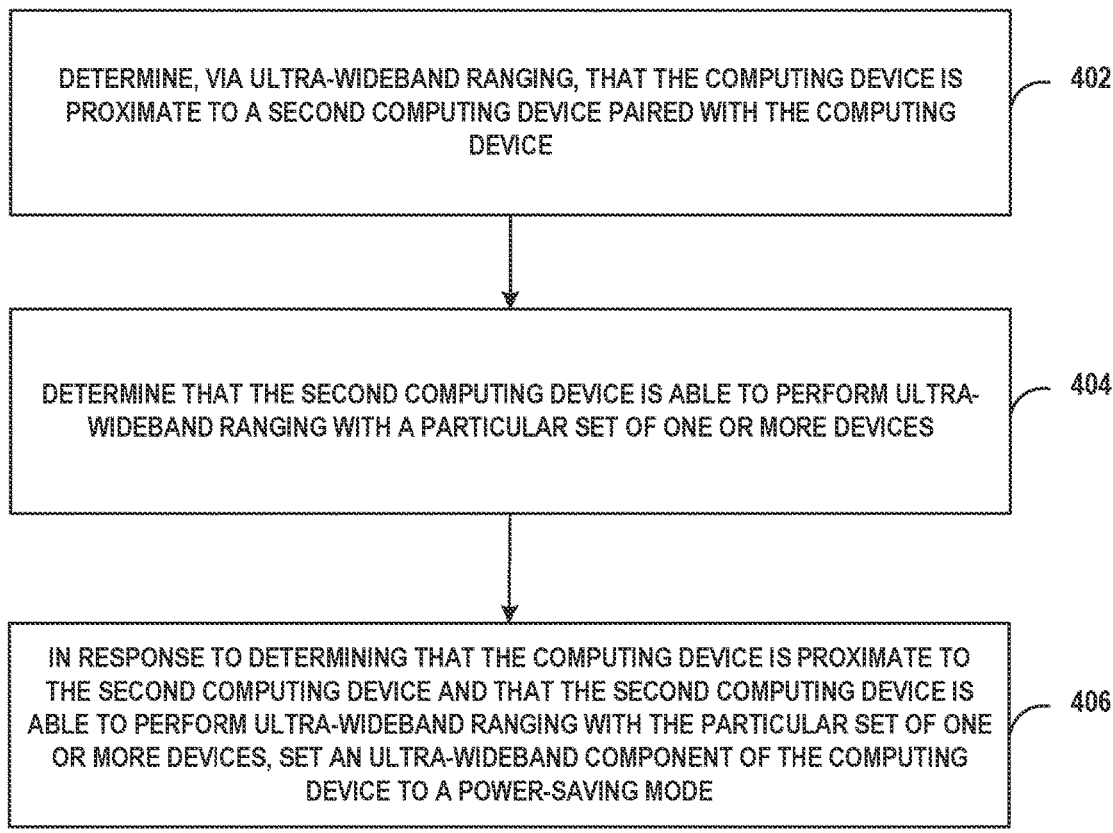
FIG. 4 is a flow diagram illustrating example operations of a computing device that performs ultra-wideband ranging, in accordance with one or more aspects of the present disclosure.

FIG. 4 is a flow diagram illustrating example operations of a computing device that performs ultra-wideband ranging, in accordance with one or more aspects of the present disclosure. For purposes of illustration only, the example operations are described below within the context of computing device 110 of FIG. 1.

As shown in FIG. 4, a first computing device 102 may determine, via ultra-wideband ranging and with or without determining the angel of arrival, that the first computing device 102 is proximate to a second computing device 110 paired with the first computing device 102 (402). The first computing device 102 may determine that the second computing device 110 is able to perform ultra-wideband ranging with a particular set of one or more devices (404). The first computing device 102 may, in response to determining that the first computing device 102 is proximate to the second computing device 110 and that the second computing device 110 is able to perform ultra-wideband ranging with the particular set of one or more devices, set an ultra-wideband component 108 of the first computing device 102 to a power-saving mode (406).

In some examples, the particular set of one or more devices comprises all ultra-wideband-enabled devices that are paired with both the first computing device 102 and the second computing device 110. In some examples, the particular set of one or more devices comprises all ultra-wideband-enabled devices with which the first computing device 102 is able to perform ultra-wideband ranging.

In some examples, the first computing device 102 may, in response to setting the ultra-wideband component 108 to the power-saving mode, determine, via ultra-wideband ranging, that the first computing device 102 is no longer proximate to the second computing device 110. The first computing device 102 may, in response to determining that the first computing device 102 is no longer proximate to the second computing device 110, set the ultra-wideband component 108 to a normal operating mode for performing ultra-wideband ranging.

In some examples, first computing device 102 may, in response to setting the ultra-wideband component to the power-saving mode, determine, by the first computing device 102 and via ultra-wideband ranging, that the first computing device 102 is still proximate to the second computing device 110 and that the second computing device 110 is not able to perform ultra-wideband ranging with the particular set of one or more devices. The first computing device 102 may, in response to determining that the second computing device 110 is not able to perform ultra-wideband ranging with the particular set of one or more devices, set the ultra-wideband component 108 to a normal operating mode for performing ultra-wideband ranging.

In some examples, to set the ultra-wideband component 108 to the power-saving mode, the first computing device 102 may decrease a frequency with which the ultra-wideband component 108 performs ultra-wideband ranging. In some examples, to the ultra-wideband component to the normal operating mode, the first computing device 102 may increase a frequency with which the ultra-wideband component performs for performing ultra-wideband ranging.

In some examples, to determine that the first computing device 102 is proximate to the second computing device 110, computing device 102 may periodically determine, using the ultra-wideband component 108, a respective physical distance between the first computing device 102 and each of one or more ultra-wideband-enabled devices that are within ultra-wideband range of the first computing device 102.

In some examples, computing device 102 may recognize a physical activity being performed by a user associated with the first computing device 102 and the second computing device 110. Computing device may, in response to recognizing the physical activity being performed by the user associated with the first computing device 102 and the second computing device 110, change a frequency with which the ultra-wideband component 108 performs ultra-wideband ranging.

In some examples, the first computing device 102 comprises a wearable device and wherein the second computing device comprises a smart phone.

This disclosure includes the following examples.

Example 1: A method includes determining, by a first computing device and via ultra-wideband ranging, that the first computing device is proximate to a second computing device paired with the first computing device; determining, by the first computing device, that the second computing device is able to perform ultra-wideband ranging with a particular set of one or more devices; and in response to determining that the first computing device is proximate to the second computing device and that the second computing device is able to perform ultra-wideband ranging with the particular set of one or more devices, setting, by the first computing device, an ultra-wideband component of the first computing device to a power-saving mode.

Example 2: The method of example 1, wherein the particular set of one or more devices comprises all ultra-wideband-enabled devices that are paired with both the first computing device and the second computing device.

Example 3: The method of example 1, wherein the particular set of one or more devices comprises all ultra-wideband-enabled devices with which the first computing device is able to perform ultra-wideband ranging.

Example 4: The method of any of examples 1-3, further includes in response to setting the ultra-wideband component to the power-saving mode, determining, by the first computing device and via ultra-wideband ranging, that the first computing device is no longer proximate to the second computing device; and in response to determining that the first computing device is no longer proximate to the second computing device, setting, by the first computing device, the ultra-wideband component to a normal operating mode for performing ultra-wideband ranging.

Example 5: The method of any of examples 1-3, further includes in response to setting the ultra-wideband component to the power-saving mode, determining, by the first computing device and via ultra-wideband ranging, that the first computing device is still proximate to the second computing device and that the second computing device is not able to perform ultra-wideband ranging with the particular set of one or more devices; and in response to determining that the second computing device is not able to perform ultra-wideband ranging with the particular set of one or more devices, setting, by the first computing device, the ultra-wideband component to a normal operating mode for performing ultra-wideband ranging.

Example 6: The method of any of examples 1-5, wherein setting the ultra-wideband component to the power-saving mode further comprises: decreasing, by the first computing device, a frequency with which the ultra-wideband component performs ultra-wideband ranging.

Example 7: The method of any of examples 4-6, wherein setting the ultra-wideband component to the normal operating mode further comprises: increasing, by the first computing device, a frequency with which the ultra-wideband component performs for performing ultra-wideband ranging.

Example 8: The method of any of examples 1-7, wherein determining that the first computing device is proximate to the second computing device further comprises: periodically determining, by the first computing device and using the ultra-wideband component, a respective physical distance between the first computing device and each of one or more ultra-wideband-enabled devices that are within ultra-wideband range of the first computing device.

Example 9: The method of any of examples 1-8, further includes recognizing, by the first computing device, a physical activity being performed by a user associated with the first computing device and the second computing device; and in response to recognizing the physical activity being performed by the user associated with the first computing device and the second computing device, changing, by the first computing device, a frequency with which the ultra-wideband component performs ultra-wideband ranging.

Example 10: The method of any of examples 1-9, wherein the first computing device comprises a wearable device and wherein the second computing device comprises a smart phone.

Example 11: A computing device includes: a memory; an ultra-wideband component; an ultra-wideband communication component; and one or more processors communicably coupled to the memory and the ultra-wideband component and configured to: determine, via ultra-wideband ranging, that the computing device is proximate to a second computing device paired with the computing device; determine that the second computing device is able to perform ultra-wideband ranging with a particular set of one or more devices; and in response to determining that the computing device is proximate to the second computing device and that the second computing device is able to perform ultra-wideband ranging with the particular set of one or more devices, set the ultra-wideband component of the first computing device to a power-saving mode.

Example 12: The computing device of example 11, wherein the particular set of one or more devices comprises all ultra-wideband-enabled devices that are paired with both the computing device and the second computing device.

Example 13: The computing device of example 11, wherein the particular set of one or more devices comprises all ultra-wideband-enabled devices with which the computing device is able to perform ultra-wideband ranging.

Example 14: The computing device of any of examples 11-13, wherein the one or more processors are further configured to: in response to setting the ultra-wideband component to the power-saving mode, determine, via ultra-wideband ranging, that the computing device is no longer proximate to the second computing device; and in response to determining that the computing device is no longer proximate to the second computing device, set the ultra-wideband component to a normal operating mode for performing ultra-wideband ranging.

Example 15: The computing device of any of examples 11-13, wherein the one or more processors are further configured to: in response to setting the ultra-wideband component to the power-saving mode, determine, via ultra-wideband ranging, that the computing device is still proximate to the second computing device and that the second computing device is not able to perform ultra-wideband ranging with the particular set of one or more devices; and in response to determining that the second computing device is not able to perform ultra-wideband ranging with the particular set of one or more devices, set the ultra-wideband component to a normal operating mode for performing ultra-wideband ranging.

Example 16: The computing device of any of examples 11-15, wherein to set the ultra-wideband component to the power-saving mode, the one or more processors are further configured to: decrease a frequency with which the ultra-wideband component performs ultra-wideband ranging.

Example 17: The computing device of any of examples 14-16, wherein to set the ultra-wideband component to the normal operating mode, the one or more processors are further configured to: increase a frequency with which the ultra-wideband component performs for performing ultra-wideband ranging.

Example 18: The computing device of any of examples 11-17, wherein to determine that the computing device is proximate to the second computing device, the one or more processors are further configured to: periodically determine, using the ultra-wideband component, a respective physical distance between the computing device and each of one or more ultra-wideband-enabled devices that are within ultra-wideband range of the computing device.

Example 19: The computing device of any of examples 11-18, wherein the one or more processors are further configured to: recognize a physical activity being performed by a user associated with the computing device and the second computing device; and in response to recognizing the physical activity being performed by the user associated with the computing device and the second computing device, change a frequency with which the ultra-wideband component performs ultra-wideband ranging.

Example 20: A computer-readable storage medium storing instructions that, when executed, cause one or more processors of a computing device to: determine, via ultra-wideband ranging, that the computing device is proximate to a second computing device paired with the computing device; determine that the second computing device is able to perform ultra-wideband ranging with a particular set of one or more devices; and in response to determining that the computing device is proximate to the second computing device and that the second computing device is able to perform ultra-wideband ranging with the particular set of one or more devices, set an ultra-wideband component of the first computing device to a power-saving mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A method comprising:
   determining, by a first computing device and via ultra-wideband ranging, that the first computing device is proximate to a second computing device paired with the first computing device;
   determining, by the first computing device, that the second computing device is able to perform ultra-wideband ranging with a particular set of one or more devices;
   in response to determining that the first computing device is proximate to the second computing device and that the second computing device is able to perform ultra-wideband ranging with the particular set of one or more devices, setting, by the first computing device, an ultra-wideband component of the first computing device to a power-saving mode;
   after setting the ultra-wideband component to the power-saving mode, determining, by the first computing device and via ultra-wideband ranging, that the first computing device is still proximate to the second computing device and that the second computing device is not able to perform ultra-wideband ranging with the particular set of one or more devices; and
   in response to determining that the second computing device is not able to perform ultra-wideband ranging with the particular set of one or more devices, setting, by the first computing device, the ultra-wideband component to a normal operating mode for performing ultra-wideband ranging.

2. The method of claim 1, wherein the particular set of one or more devices comprises all ultra-wideband-enabled devices that are paired with both the first computing device and the second computing device.

3. The method of claim 1, wherein the particular set of one or more devices comprises all ultra-wideband-enabled devices with which the first computing device is able to perform ultra-wideband ranging.

4. The method of claim 1, further comprising:
   in response to setting the ultra-wideband component to the power-saving mode, determining, by the first computing device and via ultra-wideband ranging, that the first computing device is no longer proximate to the second computing device; and
   in response to determining that the first computing device is no longer proximate to the second computing device, setting, by the first computing device, the ultra-wideband component to a normal operating mode for performing ultra-wideband ranging.

5. The method of claim 1, wherein setting the ultra-wideband component to the power-saving mode further comprises:
   decreasing, by the first computing device, a frequency with which the ultra-wideband component performs ultra-wideband ranging.

6. The method of claim 4, wherein setting the ultra-wideband component to the normal operating mode further comprises:
   increasing, by the first computing device, a frequency with which the ultra-wideband component performs ultra-wideband ranging.

7. The method of any of claim 1, wherein determining that the first computing device is proximate to the second computing device further comprises:

periodically determining, by the first computing device and using the ultra-wideband component, a respective physical distance between the first computing device and each of one or more ultra-wideband-enabled devices that are within ultra-wideband range of the first computing device.

8. The method of claim 1, further comprising:
recognizing, by the first computing device, a physical activity being performed by a user associated with the first computing device and the second computing device; and
in response to recognizing the physical activity being performed by the user associated with the first computing device and the second computing device, changing, by the first computing device, a frequency with which the ultra-wideband component performs ultra-wideband ranging.

9. The method of claim 1, wherein the first computing device comprises a wearable device and wherein the second computing device comprises a smart phone.

10. A computing device includes:
a memory;
an ultra-wideband component;
an ultra-wideband communication component; and
one or more processors communicably coupled to the memory and the ultra-wideband component and configured to:
determine, via ultra-wideband ranging, that the computing device is proximate to a second computing device paired with the computing device;
determine that the second computing device is able to perform ultra-wideband ranging with a particular set of one or more devices;
in response to determining that the computing device is proximate to the second computing device and that the second computing device is able to perform ultra-wideband ranging with the particular set of one or more devices, set the ultra-wideband component of the computing device to a power-saving mode;
after setting the ultra-wideband component to the power-saving mode, determine, via ultra-wideband ranging, that the computing device is still proximate to the second computing device and that the second computing device is not able to perform ultra-wideband ranging with the particular set of one or more devices; and
in response to determining that the second computing device is not able to perform ultra-wideband ranging with the particular set of one or more devices, set the ultra-wideband component to a normal operating mode for performing ultra-wideband ranging.

11. The computing device of claim 10, wherein the particular set of one or more devices comprises all ultra-wideband-enabled devices that are paired with both the computing device and the second computing device.

12. The computing device of claim 10, wherein the particular set of one or more devices comprises all ultra-wideband-enabled devices with which the computing device is able to perform ultra-wideband ranging.

13. The computing device of claim 10, wherein the one or more processors are further configured to:
in response to setting the ultra-wideband component to the power-saving mode, determine, via ultra-wideband ranging, that the computing device is no longer proximate to the second computing device; and
in response to determining that the computing device is no longer proximate to the second computing device, set the ultra-wideband component to a normal operating mode for performing ultra-wideband ranging.

14. The computing device of claim 10, wherein to set the ultra-wideband component to the power-saving mode, the one or more processors are further configured to:
decrease a frequency with which the ultra-wideband component performs ultra-wideband ranging.

15. The computing device of any of claim 13, wherein to set the ultra-wideband component to the normal operating mode, the one or more processors are further configured to:
increase a frequency with which the ultra-wideband component performs ultra-wideband ranging.

16. The computing device of claim 10, wherein to determine that the computing device is proximate to the second computing device, the one or more processors are further configured to:
periodically determine, using the ultra-wideband component, a respective physical distance between the computing device and each of one or more ultra-wideband-enabled devices that are within ultra-wideband range of the computing device.

17. The computing device of claim 16, wherein the one or more processors are further configured to:
recognize a physical activity being performed by a user associated with the computing device and the second computing device; and
in response to recognizing the physical activity being performed by the user associated with the computing device and the second computing device, change a frequency with which the ultra-wideband component performs ultra-wideband ranging.

18. A non-transitory computer-readable storage medium storing instructions that, when executed, cause one or more processors of a computing device to:
determine, via ultra-wideband ranging, that the computing device is proximate to a second computing device paired with the computing device;
determine that the second computing device is able to perform ultra-wideband ranging with a particular set of one or more devices;
in response to determining that the computing device is proximate to the second computing device and that the second computing device is able to perform ultra-wideband ranging with the particular set of one or more devices, set an ultra-wideband component of the computing device to a power-saving mode;
after setting the ultra-wideband component to the power-saving mode, determine, via ultra-wideband ranging, that the computing device is still proximate to the second computing device and that the second computing device is not able to perform ultra-wideband ranging with the particular set of one or more devices; and
in response to determining that the second computing device is not able to perform ultra-wideband ranging with the particular set of one or more devices, set the ultra-wideband component to a normal operating mode for performing ultra-wideband ranging.

* * * * *